Patented June 17, 1941

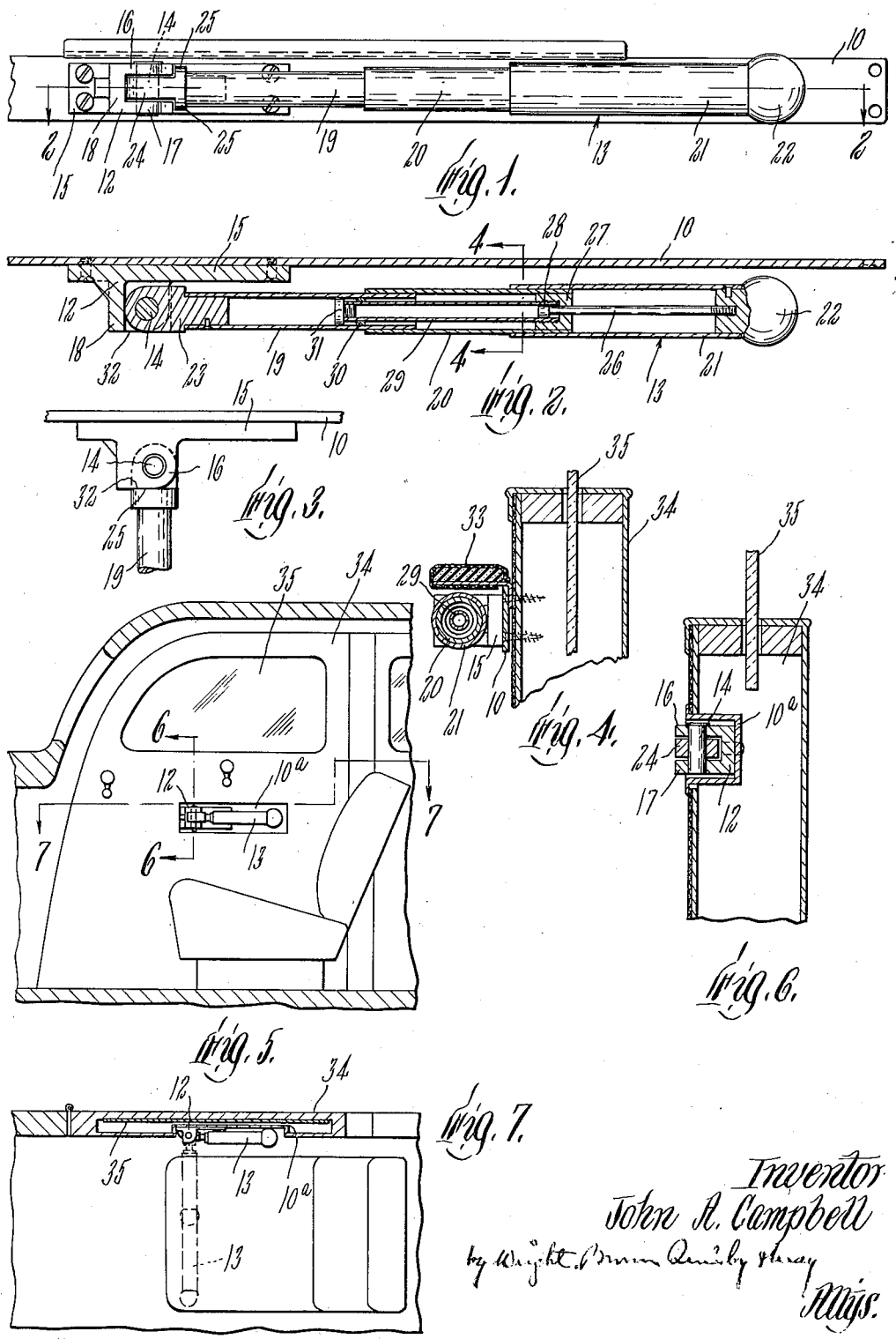

2,245,899

UNITED STATES PATENT OFFICE 2,245,899

GUARD ARM FOR PROTECTION OF PASSENGERS IN MOTOR VEHICLES

John A. Campbell, Quincy, Mass.

Application July 12, 1939, Serial No. 284,014

4 Claims. (Cl. 280—150)

The subject matter of this invention is a device for protecting the passengers of automobiles, particularly the occupant of the front seat beside the driver, from injury and possible death in case of a sudden stoppage or retardation of the car. Its main object is to safeguard human life and limb. A further object is to increase the comfort of passengers of motor vehicles.

Many injuries are caused to occupants of motor cars in consequence of a sudden stop or reduction of speed of the car. The occupants of other seats than the driver's, unless forewarned in time to brace themselves, are liable to be thrown forward from the seat. The occupant of the front seat beside the driver is in a position of particular risk, for he is liable to be thrown forward and strike the windshield with his head. The driver is in a less precarious situation because he is behind the steering wheel with both hands either grasping it or in a position to grasp it quickly. Hence unless the car is crushed or the steering wheel broken by the force of a collision, he is not greatly injured in the case of a minor accident. But the passenger in the unprotected seat beside the driver may be thrown forward violently enough to be severely injured as the result of accident far less than serious enough to wreck the car, or even by a stoppage caused by the sudden application of the brakes alone, without collision against another car or stationary object. Where the passenger has not had warning soon enough to brace himself, he may be hurled by momentum violently against the framework of the car in front of him. Instances have been known where the rider's head has been driven entirely through the windshield and badly cut. Death from bleeding in consequency of cuts by the jagged fragments of the windshield broken in this manner have occurred in all too many instances. And injuries to the head and neck are not the only results of a sudden stop. The body and limbs of a person thus thrown from a seat are often bruised and broken.

The danger is particularly great in the case of little children whose legs are too short to reach the floor when seated. They frequently slide off the seat to the floor, with the accompaniment of bumps and bruises more or less painful and severe, when the car is retarded at a rate not great enough to disturb grown persons whose feet are planted on the floor. But children, lacking this means of bracing themselves are highly vulnerable.

The advent of four wheel brakes has increased rather than diminished accidents from this cause. While the more efficient braking power due to four wheel brakes has reduced the relative number of actual collisions, the knowledge that they can stop quickly has encouraged operators to drive faster, and with less clearance from the car ahead, than formerly, and to approach road intersections more rapidly; with the result that when an emergency occurs, the car may be stopped or retarded in time to avoid collision, but so violently that unprepared occupants are thrown from their seats and injured.

My object has been to protect the passengers of automobiles from injuries due to such causes, as well as to diminish the risk of serious injury to them as the result of an actual collision. This object has been accomplished by the provision of a guard arm, or a number of such arms, mounted on the inside of a door, or a part of the car body, in a position where it can be swung aside to enable the passenger to be seated and to leave the seat without impediment, and may be brought to a position in front, and across the front, of the occupant of a seat, where it is braced against moving forward and serves as a guard rail and also as a support on which the passenger may rest his hands.

An embodiment of the invention is illustrated in the drawing furnished herewith, in which Fig. 1 is a side view of an attachment adapted to be mounted in a car and including a pivoted telescopic arm; such arm being shown extended to substantially full length but swung back against the mounting;

Fig. 2 is a sectional view taken on line 2—2 of Fig. 1;

Fig. 3 is a fragmentary plan view showing the guard arm swung out into its protecting position;

Fig. 4 is a vertical fragmentary section of the door of an automobile with the protective device mounted thereon; the section being taken on line 4—4 of Fig. 2;

Fig. 5 is a fragmentary longitudinal section of an automobile showing the front seat and the right hand forward door in elevation and illustrating one mode of mounting my protective attachment in or on the door;

Fig. 6 is a vertical section on line 6—6 of Fig. 5;

Fig. 7 is a horizontal section on line 7—7 of Fig. 5.

Like reference characters designate the same parts wherever they occur in all the figures.

The protective device or attachment consists of a base 10, a bracket 12 secured to the base and an arm 13 pivoted to the bracket by a substantially vertical pin 14. The base and its equivalents may be of various forms and constructions according to the position in which it is to be mounted in a car. If it is to be applied to the inner side of a car door without disturbing the lining, or similarly applied to some other part of the car body, it is made as a flat elongated plate of metal, preferably steel, of which the length dimensions is substantially perpendicular to the pivot pin axis, sufficiently thick to have all necessary rigidity, and provided with holes for bolts or screws by which it may be secured to the framing of the door or car body. This is the type of base shown in Figs. 1, 2, 3 and 4. It is designed to be mounted with its length dimension substantially horizontal. But an equivalent base may be set into the door between the upright frame members thereof so as not to project materially from the inner face of the door. In that case the base may be made as a box structure 10a, as shown in Figs. 5, 6 and 7, which receives and partially envelops the protective arm when folded back out of the way.

The bracket 12 has a base portion 15 which is bolted or otherwise secured to the base 10 and parallel spaced apart lugs 16 and 17 projecting from said base portion which are reinforced and strengthened at the forward side by an integral transverse web 18.

The protective arm is made of two, three or more sections of tubing of graduated diameters fitted to slide one within another. In the embodiment shown it consists of three such sections designated respectively as 19, 20 and 21, of which the section 19 has a free sliding fit in the section 20, and the latter a similar sliding fit in the section 21. In the outer end of one section, as the section 21, the shank of a knob 22 is entered and made fast, while in the outer end of the opposite end section the shank of a block 23 is entered and made fast. Block 23 is formed with a tongue 24 of suitable dimensions to fit freely in the space between the bracket lugs 16 and 17 and with shoulders 25 on opposite sides of the tongue. The pivot pin 14 passes through alined holes in the tongue and lugs with a tight driven fit in the tongue and a free rotative fit in the lugs, or vice versa. Other means than friction, however, may be used to retain the pivot pin in place without departing from the scope of the invention.

It is not important whether the smallest section or the largest section of the telescopic arm receives the pivot block. The relative positions of the block and the knob 22 may be reversed from the arrangement shown in the drawing, and the arm turned end for end and connected at its larger end to the pivot.

Due to the construction of the arm of tubes fitting one within another, the arm as a whole may be shortened and lengthened like a telescope. Means are provided to limit the outward movement of each section with respect to the others when the arm is lengthened so as, not only to prevent dismemberment, but also to maintain a sufficient overlap of the sections to make the extended arm sufficiently rigid. Such means consists of the following parts. A rod 26 is secured to the knob 22 and extends thence axially through the tube section 21 and through a hole in a plug 27 which is secured in the adjacent end of tube section 20. A knob 28 on the end of the rod, of larger diameter than the hole in plug 27, overlaps the inner orifice of the hole and prevents the rod from being withdrawn. The length of rod 26, the position of its head, and the location of the plug, are established so as to limit the drawing out movement of the sections 20 and 21 at a point where there is a predetermined length of overlap between these sections.

A tube 29 of large enough diameter to receive the head 28 freely is secured at one end (conveniently by screw threads as shown) in a coaxial recess in the inner end of plug 27. It extends into the tube section 19 and through a ring or collar 30 secured within that section. A knob or head 31 of larger diameter than the passage through ring 30 is fastened to the end of tube 29 within the tube 20 and serves as a stop, cooperating with the ring 30, to limit outward movement of tube section 20 from tube section 19. The length of the inner tube 29, the position of its head or knob 31, and the location of the ring 30 within tube section 19, are established to limit outward movement of tube section 20 while a predetermined overlap continues between this section and the section 19. The overlap sufficient for the purpose at each joint is determined by calculations based on the maximum stress to be resisted and the strength and rigidity of the material. Preferably I use steel tubing for the sections of the arm, but may use tubing of other metals thick enough to give the necessary strength; and I may use members of other shapes than tubular, of any metal, provided they are strong enough.

In an example of the invention I have made a telescopic arm of the construction here shown which, when fully collapsed, is nine inches long from the pivot axis to the outer surface of the knob, and when fully extended has a length of eighteen inches between the same points. Such an arm when mounted on the door of an automobile beside the front seat, substantially as illustrated in Figs. 5 and 7, can be swung outward from the door and back, in the collapsed condition, without inconvenience to the occupant of the adjacent seat, even though the occupant may be corpulent; and when extended, crosses so much of the person's width as to afford a secure barrier against dislodgment of the person from the seat in case of a sudden stop. These dimensions are merely illustrative, and it must be understood that similar arms of other dimensions may be made. If constructed of more than three tube sections, the difference between extended and collapsed length may be relatively greater than that above indicated. The arm with its supporting base may be variously positioned on the door or body of the automobile; and when made for attachment over the inner wall of the door, it may be shifted to different positions. It may be located for the accommodation of average persons or for unusually large persons or for children.

The stop shoulders 25 cooperate with the lugs 16 and 17 in preventing the arm from swinging forward beyond its designed holding position. The rear edges of the lugs are curved concentric with the pivot axis, as shown in Figs. 2 and 3. But their forward portions are extended to form shoulders 32 suitably located to arrest the arm in a position at right angles to the length of the car, or at any other angle desired.

When the barrier attachment is made for mounting over the lining of a door or car body, it may have associated with it an arm rest 33, as shown in Fig. 4, for the comfort of the occupant of the adjacent seat. The barrier arm itself also serves as a rest on which the occupant may place his hands.

Each of the extension sections 20 and 21 is rotatable about the axis of the arm independently of the inner section 19 and of each other. This capacity follows from the construction and arrangement of the tube sections and their stop means, all of which are of circular cross section and coaxial with one another, with no projections or other characteristics of form which would prevent such rotation. It is a source of comfort and convenience to many people, particularly those of nervous temperament, who like to move their hands in a manner to twist the bar while grasping it. Thus the occupant of the seat may grasp the tube section 21 with his left hand and the section 20 with his right hand and perform such a twisting motion with either or both hands, and with one hand in opposite rotation to the other hand if he wishes; and need not relax his grip while so moving his hands or hand.

When the barrier arm is mounted on a door which is hinged at the forward edge to the car body, it may be used as a handle to close the door and to resist attempts of a person on the outside to open the door. The leverage or purchase available to a person sitting on the front seat and having the guard extended across him much exceeds that of a person on the outside attempting to open the door by means of the external handle. When extended to full length, it will serve as a stop to prevent accidental opening of the door even without the voluntary cooperation of the front seat passenger.

In Figs. 4, 5, 6 and 7, the reference number 34 designates the right front door of an automobile and the number 35 designates the glass window pane of the door. The barrier, or its equivalent, may be mounted also in similar relationship to the rear seat of a two seated car, at either end of the rear seat; or such barriers may be mounted at both ends of the seat. They serve a similar purpose in those locations in guarding the occupants of the rear seat from being thrown forward against the back of the front seat and as a rest for their hands.

What I claim and desire to secure by Letters Patent is:

1. A barrier device for the protection of the occupant of a seat in an automobile comprising a mounting structure adapted to be secured in such automobile adjacent to such seat, an arm pivoted to said mounting structure to swing in a substantially horizontal plane from a position adjacent to the side of the automobile in rear of the pivot axis to a position across and in front of such seat, and means for preventing forward swinging movement of the arm from the position last named; the arm being constructed of tubes, one fitted slidingly within another, a rod extending lengthwise within one of said tubes and secured to one end thereof and extending into the overlapping end of the next adjacent tube, said adjacent tube having a plug through which the rod extends and the rod having a head overlapping the rim of the orifice through said plug to prevent separation of the tubes one from the other.

2. A barrier device for the protection of the occupant of a seat in an automobile comprising a mounting structure adapted to be secured in such automobile adjacent to such seat, an arm pivoted to said mounting structure to swing in a substantially horizontal plane from a position adjacent to the side of the automobile in rear of the pivot axis to a position across and in front of such seat, and means for preventing forward swinging movement of the arm from the position last named; the arm being constructed of tubes one entering within another, an inner tube within the exterior one of the before named tubes secured at one end of the latter and extending into the entering tube, said entering tube having an internal shoulder and said interior tube having a head overlapping said shoulder to prevent separation of one tube from the other.

3. The combination of an arm consisting of two end tubes, an intermediate tube entering one end tube and receiving the other end tube in telescopic sliding connection, a rod secured at one end within one end of the larger end tube, and extending thence into the entering end of the intermediate tube, a plug secured within said entering end and having a passage through which said rod extends, the rod having a head on its end arranged to prevent withdrawal from said plug, a tube secured to said plug within the intermediate tube surrounding the head on the rod and extending into the entering end of the smaller end tube, an internal shoulder within the last named tube surrounding said inner tube, and a head on the inner tube overlapping said shoulder to prevent withdrawal of the intermediate tube from the smaller end tube.

4. A protective barrier for the occupant of a seat in an automobile consisting of a substantially rigid bracket with a base having a form enabling it to be secured to the inner face of an automobile body beside a seat within the body, a guard arm, said bracket and guard arm being provided with cooperating hinge elements, one of said elements having a stop shoulder and spaced lugs, the other of said elements having an interfitting tongue between the lugs, means pivotally connecting the tongue and lugs together, said tongue arranged to coact with the shoulder to arrest the arm when in a position substantially perpendicular to the base and prevent swinging movement in one direction from such position, said hinge elements constituting the sole support for the arm and being constructed to hold the arm with rigidity sufficient to support the weight of a normal person when the base is secured to the side of an automobile with the pivot axis substantially vertical and the arm located substantially perpendicular to the base.

JOHN A. CAMPBELL.